US008596601B1

(12) United States Patent
Andersen (10) Patent No.: US 8,596,601 B1
(45) Date of Patent: Dec. 3, 2013

(54) SELF-LEVELING PLATFORM HOOK (76) Inventor: Shelly A. Andersen, West Jordan, UT (US)

( * ) Notice: Subject to any disclaimer, the term of this patent is extended or adjusted under 35 U.S.C. 154(b) by 422 days.

(21) Appl. No.: 12/625,787

(22) Filed: Nov. 25, 2009

Related U.S. Application Data (60) Provisional application No. 61/118,787, filed on Dec. 1, 2008.

(51) Int. Cl.
*A47B 97/04* (2006.01)
(52) U.S. Cl.
USPC .............. 248/447.2; 248/229.15; 248/229.12; 248/231.71; 211/96
(58) Field of Classification Search
USPC .............. 248/304, 305, 306, 316.1, 303, 302, 248/112, 249, 309, 229.15, 229.25, 230.6, 248/228.6, 291.1, 288.11, 294.1, 914; 211/106, 112, 119, 181
See application file for complete search history.

(56) References Cited

U.S. PATENT DOCUMENTS

| 72,748 | A | * | 12/1867 | Merriam .......................... 24/512 |
|---|---|---|---|---|
| 680,680 | A | * | 8/1901 | Armstrong et al. ....... 248/231.71 |
| 746,188 | A | * | 12/1903 | Sonsthagen .............. 248/229.15 |
| 1,303,345 | A | * | 5/1919 | McFeaters ....................... 248/72 |
| 1,594,279 | A | * | 7/1926 | Steinmetz .................. 248/291.1 |
| 1,684,347 | A | | 9/1928 | Dobbs |
| 1,742,069 | A | * | 12/1929 | Greenwald et al. ....... 248/229.15 |
| 2,019,789 | A | * | 11/1935 | Mahannah ....................... 269/71 |
| 2,235,367 | A | * | 3/1941 | Heausler ........................ 248/445 |
| 2,530,265 | A | * | 11/1950 | Phalen ........................... 248/514 |
| 2,600,095 | A | * | 6/1952 | Consolo et al. ................ 248/552 |
| D177,955 | S | * | 6/1956 | Arbogast ....................... D8/355 |
| 2,896,896 | A | | 7/1959 | Revzin |
| 3,014,625 | A | * | 12/1961 | Knutson .......................... 225/80 |
| 3,082,990 | A | * | 3/1963 | Nelson ........................... 248/308 |
| 3,727,868 | A | | 4/1973 | Buchanan |
| 4,300,742 | A | | 11/1981 | Hunn |
| 4,566,666 | A | * | 1/1986 | Meska et al. .................. 248/558 |
| 4,570,837 | A | | 2/1986 | Belokin |

(Continued)

FOREIGN PATENT DOCUMENTS

| JP | 11124274 | 5/1999 |
|---|---|---|
| JP | 2003128335 | 5/2003 |

OTHER PUBLICATIONS 3M eStore: 3M Utility Bracket Dispenser M73, http://www.3mestore.com/70950073000.html, based on information and belief, available at least as early as Apr. 11, 2008.

(Continued)

*Primary Examiner* — Terrell McKinnon
*Assistant Examiner* — Daniel J Breslin
(74) *Attorney, Agent, or Firm* — Workman Nydegger (57) ABSTRACT

A self-leveling platform hook for use in supporting an object. In one embodiment, the hook includes a frame, structure coupled to the frame for attaching the frame to a support surface (e.g., a table, countertop, a wall, etc.), and a saddle including a pair of support arms coupled to the frame. The support arms are coupled to the frame at an upper end of each arm, and are rotatable relative to the frame so as to be self-leveling. In addition, each arm is independently rotatable relative to the support frame and one another such that the distance and angle between lower ends of the arms may be varied so as to cradle and support an object of a given width.

16 Claims, 13 Drawing Sheets

(56) References Cited

U.S. PATENT DOCUMENTS

| | | | |
|---|---|---|---|
| 4,620,687 A * | 11/1986 | Bishop | 248/447.2 |
| 4,666,110 A * | 5/1987 | Prouty | 248/122.1 |
| 4,728,069 A | 3/1988 | Semcer | |
| 4,832,299 A * | 5/1989 | Gorton et al. | 248/231.71 |
| 4,884,734 A | 12/1989 | Kahl, Jr. et al. | |
| 4,903,929 A * | 2/1990 | Hoffman | 248/229.15 |
| 5,078,276 A * | 1/1992 | Rogge et al. | 211/18 |
| 5,372,348 A * | 12/1994 | Cheng | 248/447.2 |
| D363,689 S | 10/1995 | Vitalune et al. | |
| D370,336 S * | 6/1996 | Rosier | D3/5 |
| 5,641,377 A * | 6/1997 | Chung et al. | 156/577 |
| 5,765,822 A | 6/1998 | Mead | |
| 5,842,671 A | 12/1998 | Gibbs | |
| 6,196,509 B1 * | 3/2001 | Clemens | 248/302 |
| 6,311,627 B1 | 11/2001 | Draper et al. | |
| 6,375,132 B1 * | 4/2002 | Tomlinson | 248/117.6 |
| 6,443,342 B1 * | 9/2002 | Kahn | 224/268 |
| 6,484,892 B1 | 11/2002 | Gooner | |
| 6,494,411 B1 * | 12/2002 | Bjorklund | 248/49 |
| 6,766,912 B1 | 7/2004 | Gibbs | |
| 6,802,483 B1 * | 10/2004 | Leasure | 248/229.15 |
| 6,983,918 B1 * | 1/2006 | Leasure | 248/311.2 |
| 6,988,690 B2 | 1/2006 | Hsu | |
| 7,178,777 B1 * | 2/2007 | Banker | 248/316.7 |
| 7,278,537 B2 | 10/2007 | Lown et al. | |
| 7,284,737 B2 | 10/2007 | Kane | |
| 7,322,543 B2 | 1/2008 | Moores | |
| 7,393,430 B1 * | 7/2008 | Herman | 156/256 |
| 7,429,024 B2 * | 9/2008 | Boklund-Moran | 248/304 |
| 7,503,539 B2 * | 3/2009 | Knight | 248/448 |
| 7,669,822 B2 * | 3/2010 | Kluge et al. | 248/308 |
| 7,891,618 B2 * | 2/2011 | Carnevali | 248/228.6 |
| 2006/0180700 A1 | 8/2006 | Wambaugh et al. | |
| 2007/0210205 A1 | 9/2007 | Tang | |
| 2007/0267148 A1 | 11/2007 | Steele et al. | |
| 2008/0067211 A1 | 3/2008 | Steele et al. | |
| 2008/0105798 A1 * | 5/2008 | Jongebloed | 248/176.1 |
| 2009/0230267 A1 * | 9/2009 | Ernst et al. | 248/231.9 |
| 2009/0266951 A1 * | 10/2009 | Phillips et al. | 248/206.5 |

OTHER PUBLICATIONS

3M Industrial Products Catalog: Scotch Pouch Tape Dispenser M727, http://solutions.3m.com/wps/portal/3M/en_US/Manufacturing/Industry/Product-Catalog/Online-Catalog/?PC_7_RJH9U5230GE3E021LECFTDQGLE0_nid=GSPNHLV5TMgsMD184R3FV3g134j4zqn4b7bl, based on information and belief, available at least as early as Apr. 11, 2008.

Tape Dispenser Keeps Tape Ready and Out of the Way, http://news.thomasnet.com/fullstory/9580, based on information and belief, available at least as early as Apr. 11, 2008.

Tape Wrangler 700S, http://www.tapewrangler.com/product/Heavy_Duty_Tape_Dispensers/Wrangler_Series/10, based on information and belief, available at least as early as Apr. 11, 2008.

* cited by examiner

SELF-LEVELING PLATFORM HOOK

CROSS-REFERENCE TO RELATED APPLICATION

The present application claims the benefit of U.S. Patent Application Ser. No. 61/118,787, filed Dec. 1, 2008, entitled "SELF-LEVELING PLATFORM HOOK", the disclosure of which is incorporated by reference in its entirety.

BACKGROUND OF THE INVENTION

1. The Field of the Invention

The present invention is in the field of devices for supporting a selected object.

2. The Relevant Technology

When scrapbooking, many friends will often meet together, bringing their own materials and tools to work together (e.g., at a single kitchen table of one of the friends). Such an activity is known as a "crop". In such an environment space is often very limited because of the number of people crammed around the table. Because of this, space is at a premium and there is a need to maximize use of the available space.

One tool routinely used by scrapbookers is an ATG tape gun, sold by Scotch (3M). The gun is marketed and sold as a picture framing tool (e.g., used to apply double sided sticky tape), although many enthusiasts within the scrapbooking field have recognized its value when used to apply double sided sticky tape when creating a scrapbook page. Besides its great utility in applying a length of double sided tape is the ability to salvage a broken role of tape. Tape dispensers marketed within the scrapbooking field (and directly intended for such use) simply do not allow salvage of a broken role of tape. The roll must be discarded and replaced with a new roll, which is wasteful. One disadvantage of using the ATG gun though, is its size and bulk. It is rather large, and takes up a large percentage of the space available to an individual scrapbooker attending such a gathering.

BRIEF SUMMARY OF THE PREFERRED EMBODIMENTS

The present invention relates to a self-leveling hook device for use in supporting an object (e.g., a gun shaped tape dispenser). In one embodiment, the hook includes a frame, means coupled to the frame for attaching the frame to a support surface (e.g., a table, countertop, wall, etc.), and a saddle including a pair of support arms coupled to the frame. The support arms are coupled to the frame at one end of each arm, and are selectively rotatable relative to the frame so as to be self-leveling. In addition, each arm is independently rotatable relative to the support frame and one another such that the arm ends opposite from where the arms are coupled to the frame may be moved apart from one another to provide a desired spacing so as to cradle and support an object having a width within a wide range.

In one embodiment (e.g., in which the frame is configured to clamp to a tabletop), the frame is generally C-shaped, including a first leg that is oriented substantially vertically (e.g., when coupled to a horizontal tabletop), a perpendicular foot extending from one end thereof, and a perpendicular bracket extending near an end opposite the foot. The foot and bracket are substantially parallel to one another. The bracket includes a threaded hole formed through the bracket for receiving a threaded stem of a compression knob assembly.

An exemplary compression knob assembly for attaching the frame to a support surface (e.g., a tabletop) includes a threaded stem, a compression knob at one end of the stem, and a compression disc at an opposite end of the stem. The stem is disposed through the hole of the frame bracket. In use, the compression knob can be rotated to adjust the distance between the foot and the compression disc so as to accommodate a given width of a table top, counter top, or other support surface to which the device is to be coupled.

In one embodiment, the spaced apart support arms include a first upper arm portion and a lower substantially horizontal platform arm portion. When viewed from the side, the upper arm portions are substantially parallel to the vertical leg of the frame, and the upper arm portions are coupled to the frame on a front side opposite from the bracket, foot, and compression knob assembly disposed on a back side. Such a configuration allows the bracket and foot back side of the frame to couple to the edge of a tabletop, allowing the support arms to hang off the edge of the table. A tape dispensing gun or other item can conveniently be supported tableside by such a configuration. For example, the handle of a T-shaped tape dispensing gun extends downward between the platform arm portions, while the upper dispensing portion of the tape dispenser gun rests on the platform arm portions, supporting it convenient for easy access by a user, and without using any of the limited table top space.

The support arms are advantageously able to freely rotate about their coupling point to the frame (e.g., by means of a compression fastener comprising a bolt, a knob, a washer, and a nut). The support arms may be rotated apart from one another about their coupling points at the upper arm portion to provide a desired spacing, and the compression fastener tightened to maintain the selected spacing and angle between the arms. In addition, because the arms are coupled to the frame so as to be rotatable about the frame, the arms form a saddle that is self-leveling, able to provide a level, horizontal support plane between the) platform arms, even if the frame is coupled to a surface that is not horizontal the frame may even be mounted to a vertical surface, such as a door).

The self-leveling platform hook is not limited to use as a device for supporting a tape dispenser adjacent a table top edge. For example, the hook may be used to support other objects. The described compression knob attachment means may be replaced with another attachment means. Such embodiments may be used as a self-leveling picture hook or as a tool holder that mounts to a peg board.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by references to specific embodiments thereof, which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

I. Introduction

The present invention relates to a self-leveling hook device for use in supporting an object. In one embodiment, the hook includes a frame, means coupled to the frame for attaching the frame to a support surface (e.g., a table, countertop, a wall, etc.), and a saddle including a pair of support arms coupled to the frame. The support arms are coupled to the frame at an upper end of each arm, and are selectively rotatable relative to the frame so as to be self-leveling. In addition, each arm is coupled at an upper portion thereof so as to be independently rotatable relative to the frame and one another such that a distance between the lower free ends may be varied so as to cradle and support an object of any width within the adjustable range.

II. Exemplary Self-Leveling Platform Hooks

FIGS. 1-7 illustrate an exemplary self-leveling platform hook 100 of the present invention. The hook includes a frame 102, a compression knob assembly 104 for attaching the frame to a table top or other support surface, and a saddle 106 comprising a pair of support arms 108a and 108b, respectively. Frame 102 is generally C-shaped, including a vertical leg 110, a foot member 112, and a bracket 114. Tapered foot member 112 extends laterally outward from one end of leg 110, and bracket 114 extends laterally outward in the same direction as foot 112, but is located near an opposite end of leg 110 so that foot 112 and bracket 114 are spaced apart and extend substantially parallel to one another. Bracket 114 includes a threaded through-hole 116 through which the compression knob assembly 104 is fitted.

Compression knob assembly 104 includes a threaded stem 118 with a knob 120 disposed at one end thereof. A compression disc 122 is disposed at an opposite end of the threaded stem 118, and stem 118 extends through hole 116 of bracket 114, so that knob 120 is disposed on a top side of bracket 114, while disc 122 is disposed on an opposite bottom side of bracket 114. The user is able to selectively rotate knob 120 so as to raise and lower disc 122, adjusting the distance between foot 112 and disc 122. This exemplary configuration of attachment means allows the user to adjust the distance between foot 112 and disc 122 to accommodate a variety of widths of a tabletop, countertop, or other support surface (e.g., a vertically oriented door).

Figure 1:
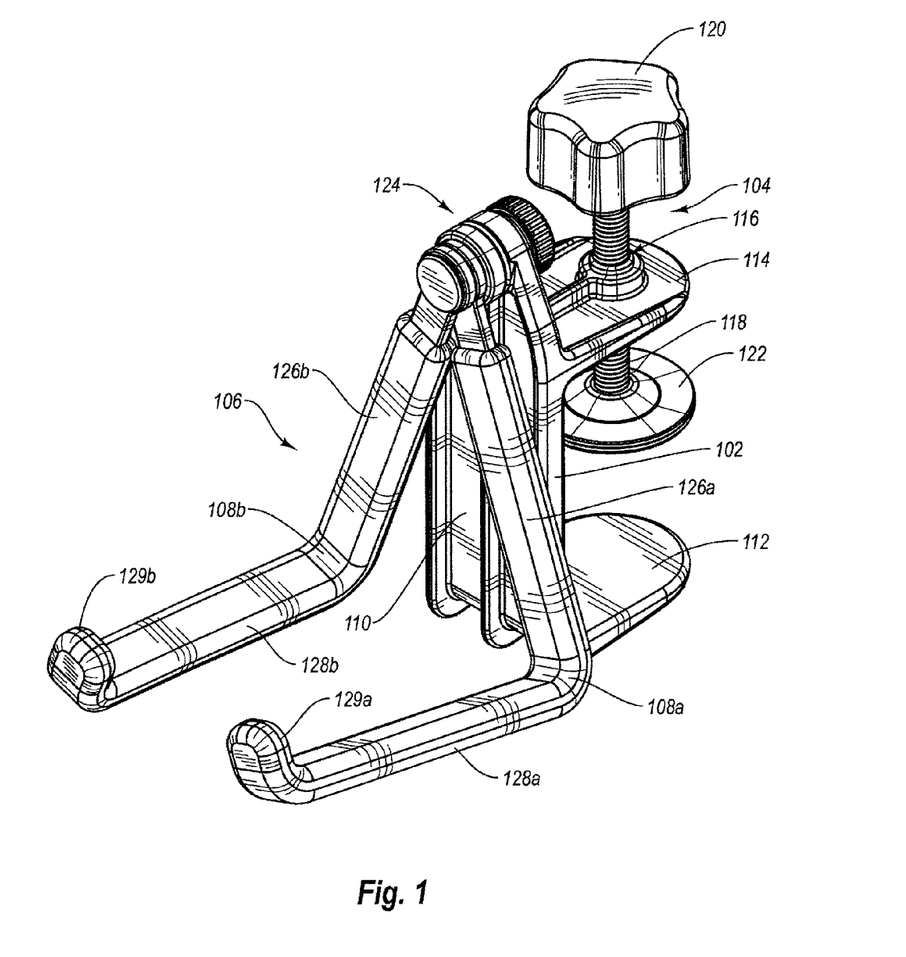
FIG. 1 is a perspective view of an exemplary self-leveling platform hook according to the present invention.
Figure 2:
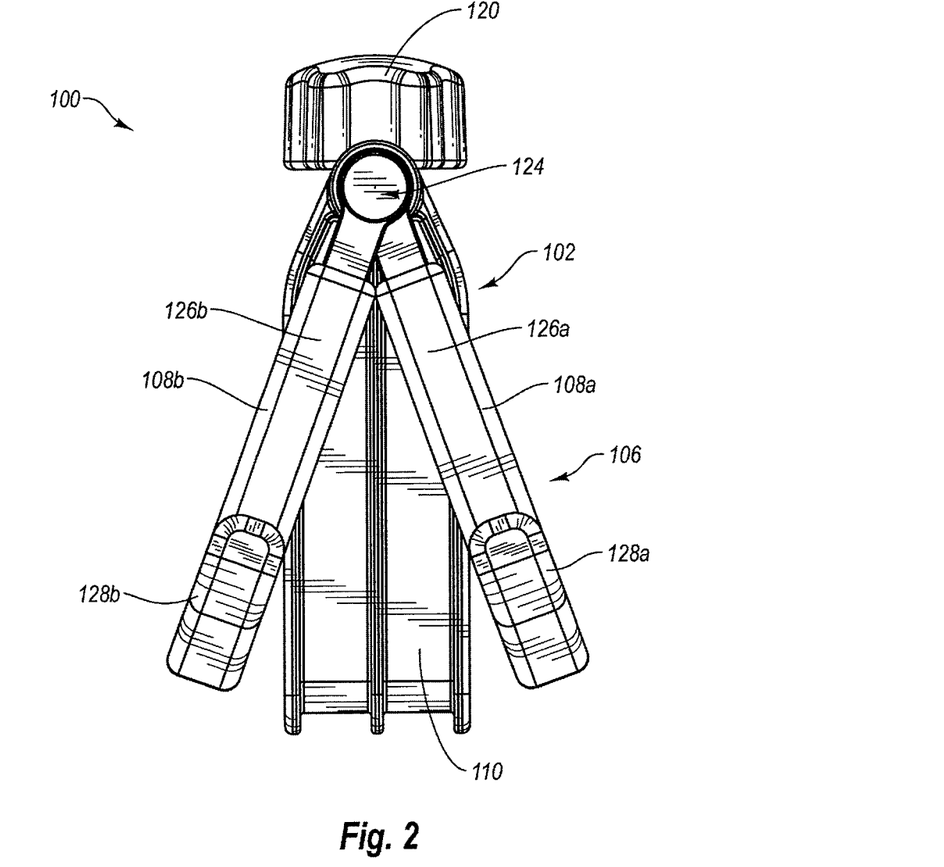
FIG. 2 is a front elevational view of the hook of FIG. 1.
Figure 3:
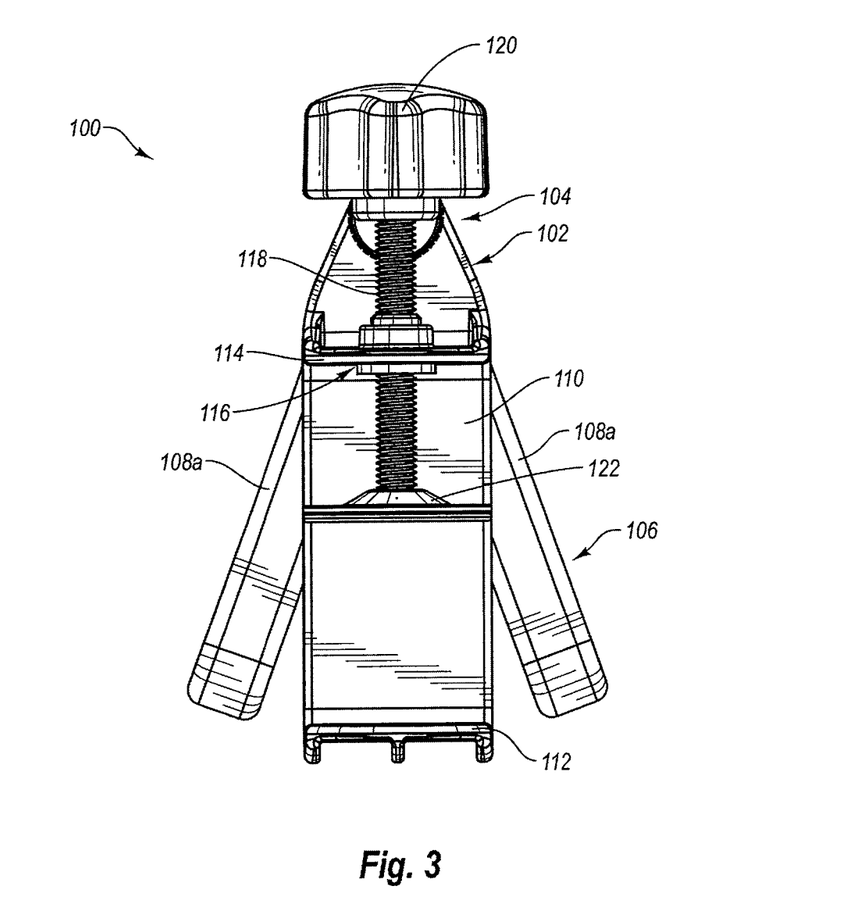
FIG. 3 is a back elevational view of the hook of FIG. 1.
Figure 4:
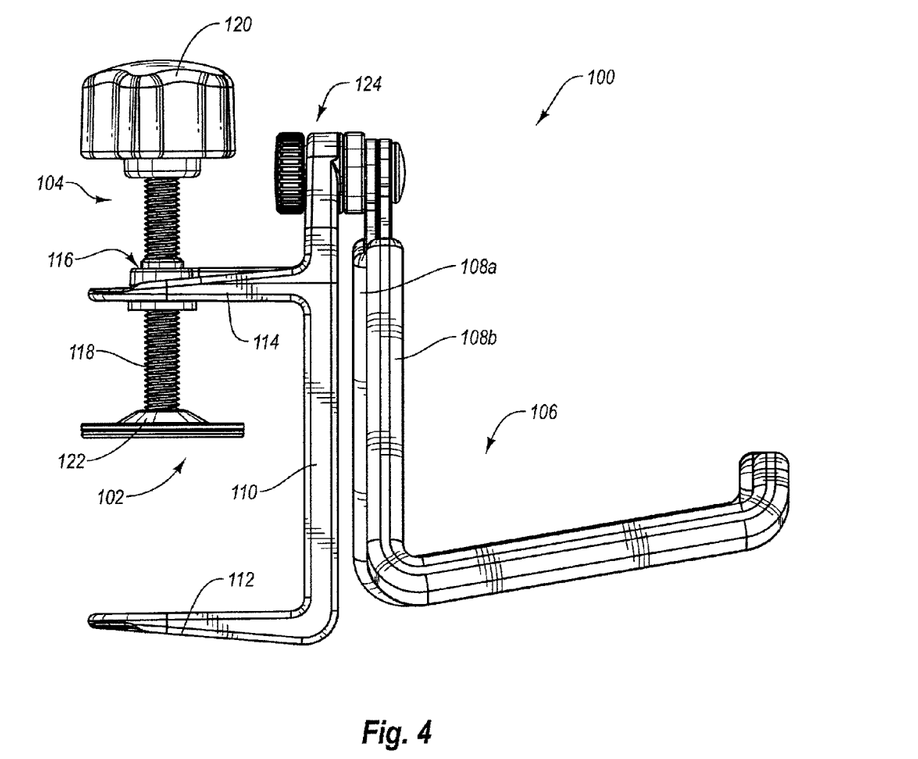
FIG. 4 is a first side view of the hook of FIG. 1.
Figure 5:
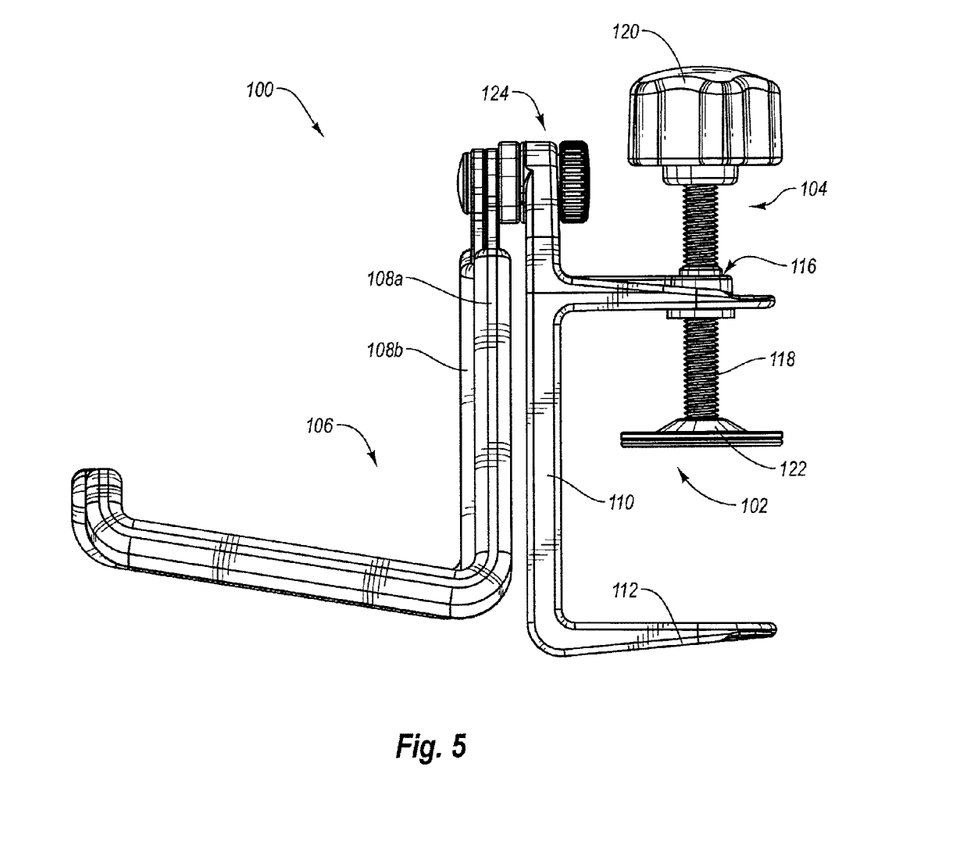
FIG. 5 is an opposing, second side view of the hook of FIG. 1.
Figure 6:
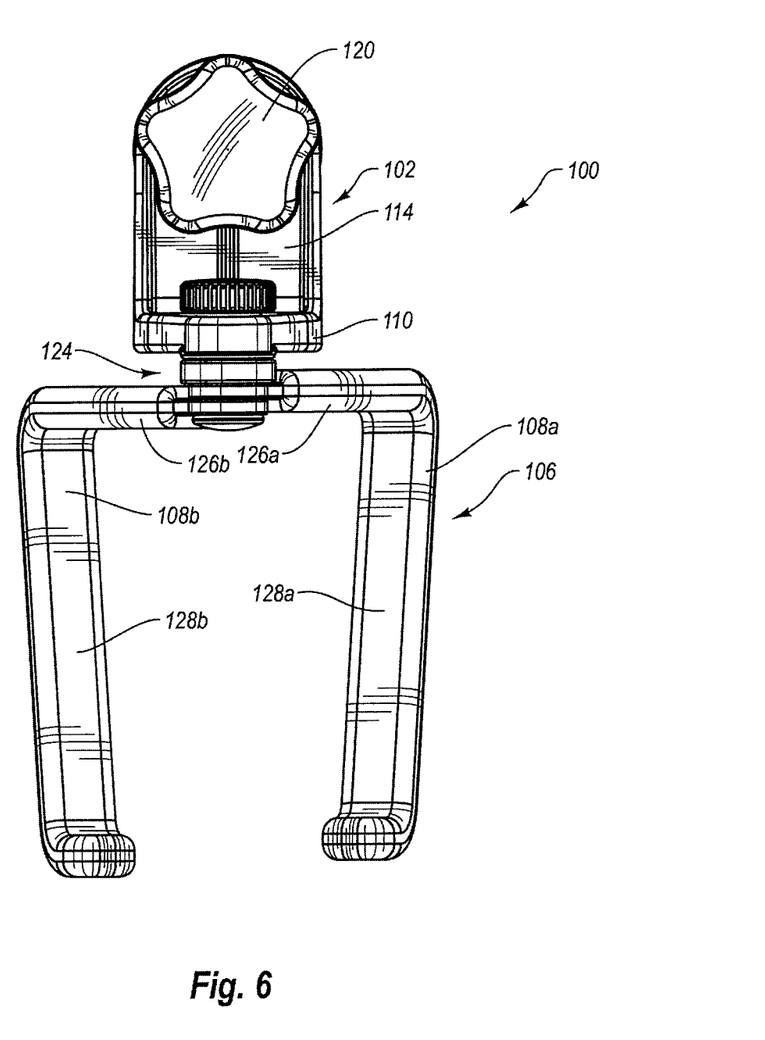
FIG. 6 is a top view of the hook of FIG. 1.
Figure 7:
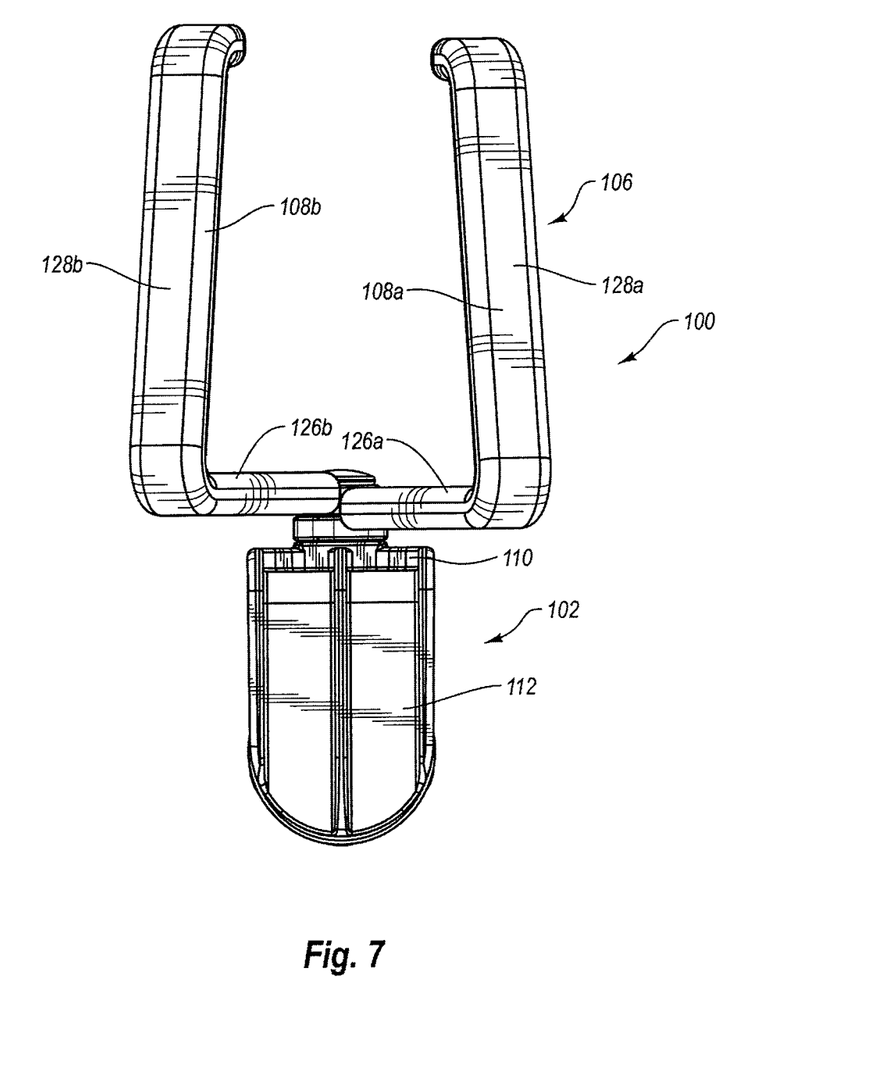
FIG. 7 is an opposing, bottom view of the hook of FIG. 1.

Saddle 106 includes two support arms 108a and 108b, each of which is pivotally connected to an upper portion of frame member 110 by means of a fastener 124. Each support arm is generally L-shaped, including a upper arm portion 126a, 126b and a lower platform arm portion 128a, 128b. Platform portions 128a, 128b extend in a direction substantially perpendicular to first arm members 126a, 126b so as to define a generally horizontal support plane for supporting an object to be supported by hook 100. Portions 128a, 128b may further include a small lip or angled extension portion 129a, 129b, as shown to prevent a supported item from sliding out of saddle 106. Arms 108a, 108b may comprise metal (e.g., bent sheet metal) over which an elastomeric (e.g., rubber) cover 109a, 109b (FIG. 8) is provided.

Figure 8:
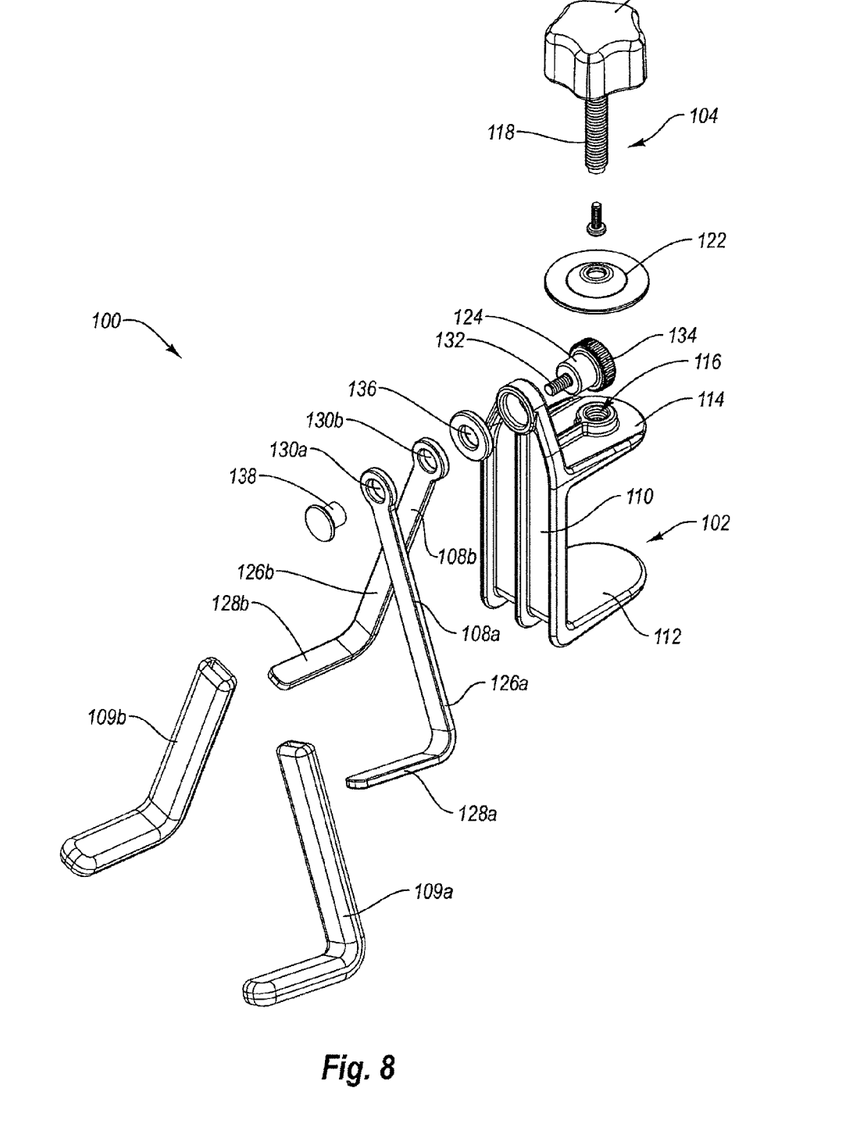
FIG. 8 is an exploded view of the hook of FIG. 1.

As perhaps best seen in the exploded view of FIG. 8, each arm includes a through-hole 130a, 130b through an end of upper portions 126a, 126b opposite lower platform portions 128a, 128b. When assembled, holes 130a and 130b are aligned, and fastener 124 (e.g., including a threaded stem 132, a knob 134, washer 136, and a nut 138) couples arms 108a and 108b to frame member 110 of frame 102. Advantageously, arms 108a and 108b freely pivot about fastener 124, so as to be self-leveling. In addition, the arms are independently pivotable relative to one another, such that the distance between lower platform portions 128a and 128b can be adjusted by the user. For example, by loosening knob 134, the user can then adjust the spacing and angle of the arms as desired, and then retighten knob 134 to hold the spacing and angle. This allows adjustment of the spacing between platforms 128a and 128b so as to accommodate the width of any of various objects to be supported by hook 100.

Figure 9:
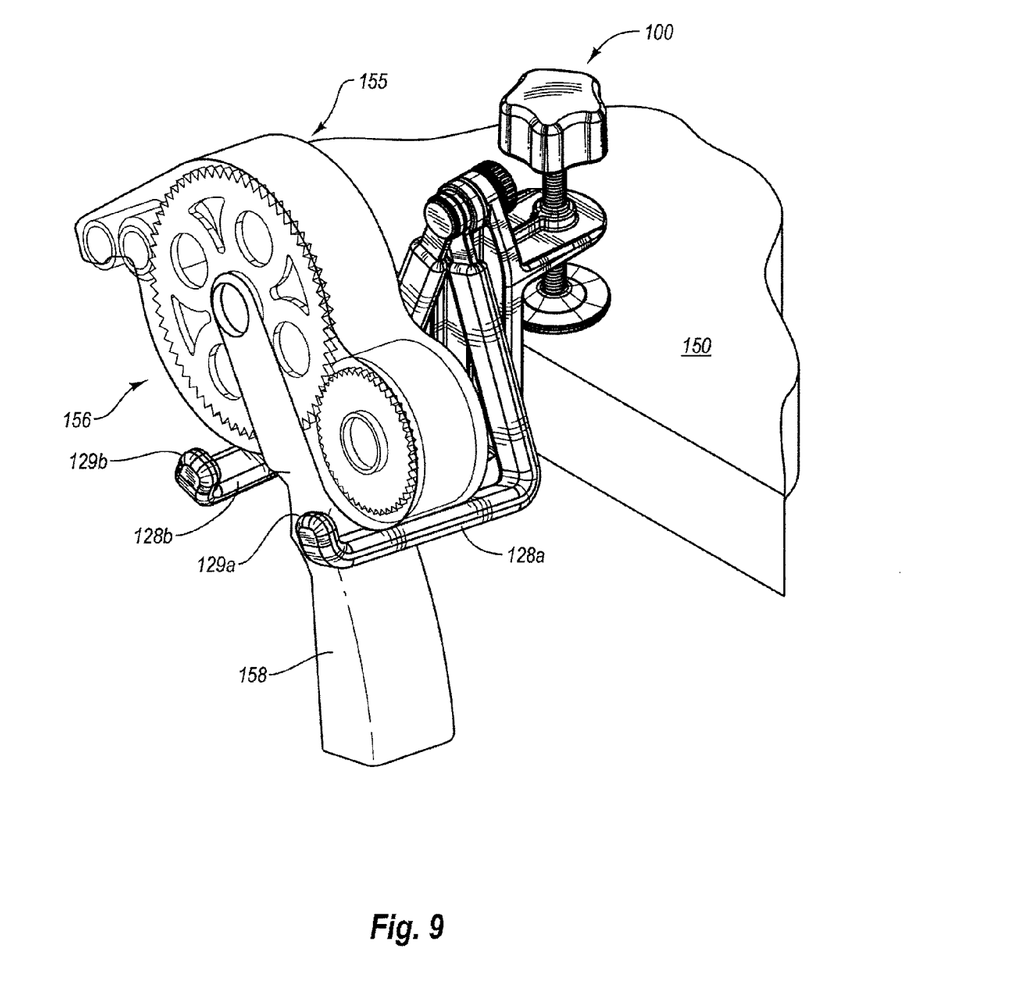
FIG. 9 is a perspective view of the hook of FIG. 1 clamped to a table top with a gun shaped tape dispenser resting within the saddle of the hook.

FIG. 9 illustrates hook 100 clamped to a tabletop 150, for example, at a scrapbooking crop. Tape dispensing gun 155 is supported by platform members 128a, 128b. Tape gun 155 is generally T-shaped, including an upper dispensing portion 156, and an elongate handle 158 that extends downwardly from upper portion 156, extending from approximately the center of upper portion 156. Handle 158 extends through the space between lower platform portions 128a, 128b, while upper portion 156 rests on platform portions 128a, 128b.

A user is able to quickly and easily take gun-shaped tape dispenser 155 from holder 100 when desired for use, and replace it as shown in FIG. 9, so that the tape gun 155 occupies essentially none of the limited table space, while being tableside, ready for quick and easy access. In one embodiment, lower platform portions 128a, 128b may each comprise a magnetic material or be formed of a metal material subject to magnetic attraction (e.g., arms 128a, 128b may be formed of a iron containing metal material), and an associated magnetic or magnetically attractable material (e.g., iron containing) may be disposed on or within the upper dispensing portion of the tape dispenser 155. Such an embodiment advantageously stabilizes the tape gun 155 within the hook 100. For example, when upper portion 156 rests on platform portions 128a, 128b magnetic attraction between the platform portions and corresponding magnetic/magnetically attractable material in the dispenser results in steadying of tape dispensing gun 155, preventing accidental dislodgement. Preferably at least part of platform portions 128a, 128b are formed of a strongly magnetic material so that all that would be required is to place one or more small pieces of magnetically attractable pieces of metal within upper portion 156 of tape dispenser 155. Angled ends 129a and 129b further aid in preventing accidental dislodgement.

Figure 10A:
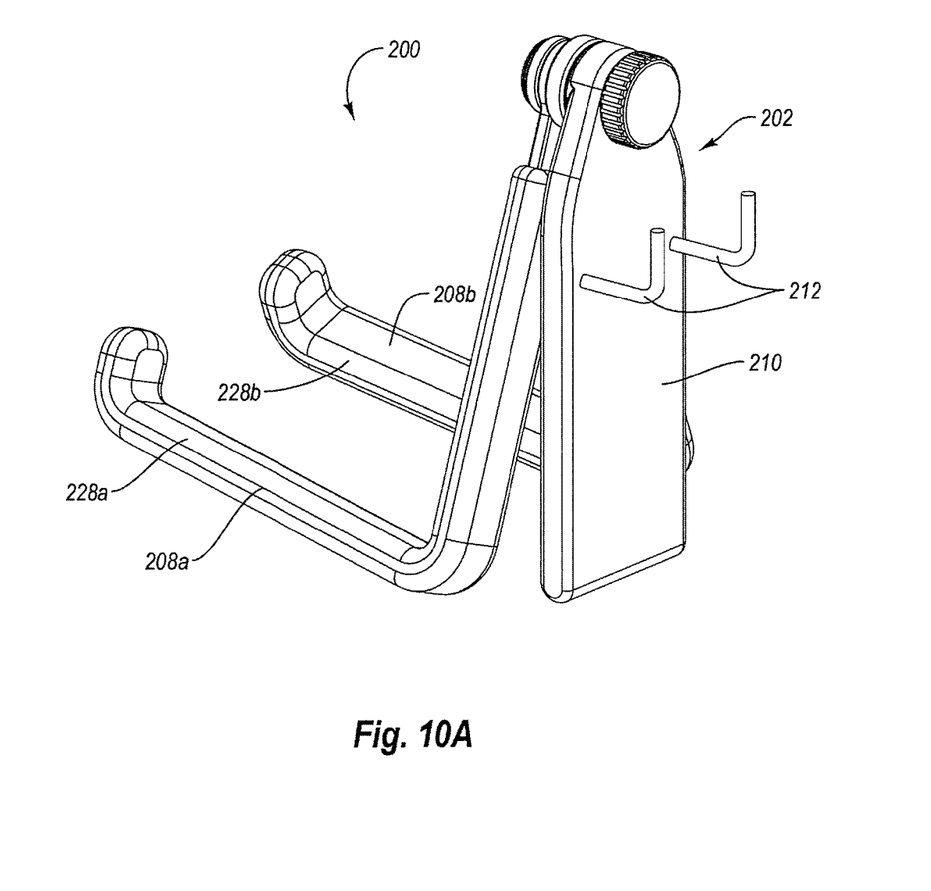
FIG. 10A is a perspective view of an alternative hook configured for mounting to a peg board.
Figure 10B:
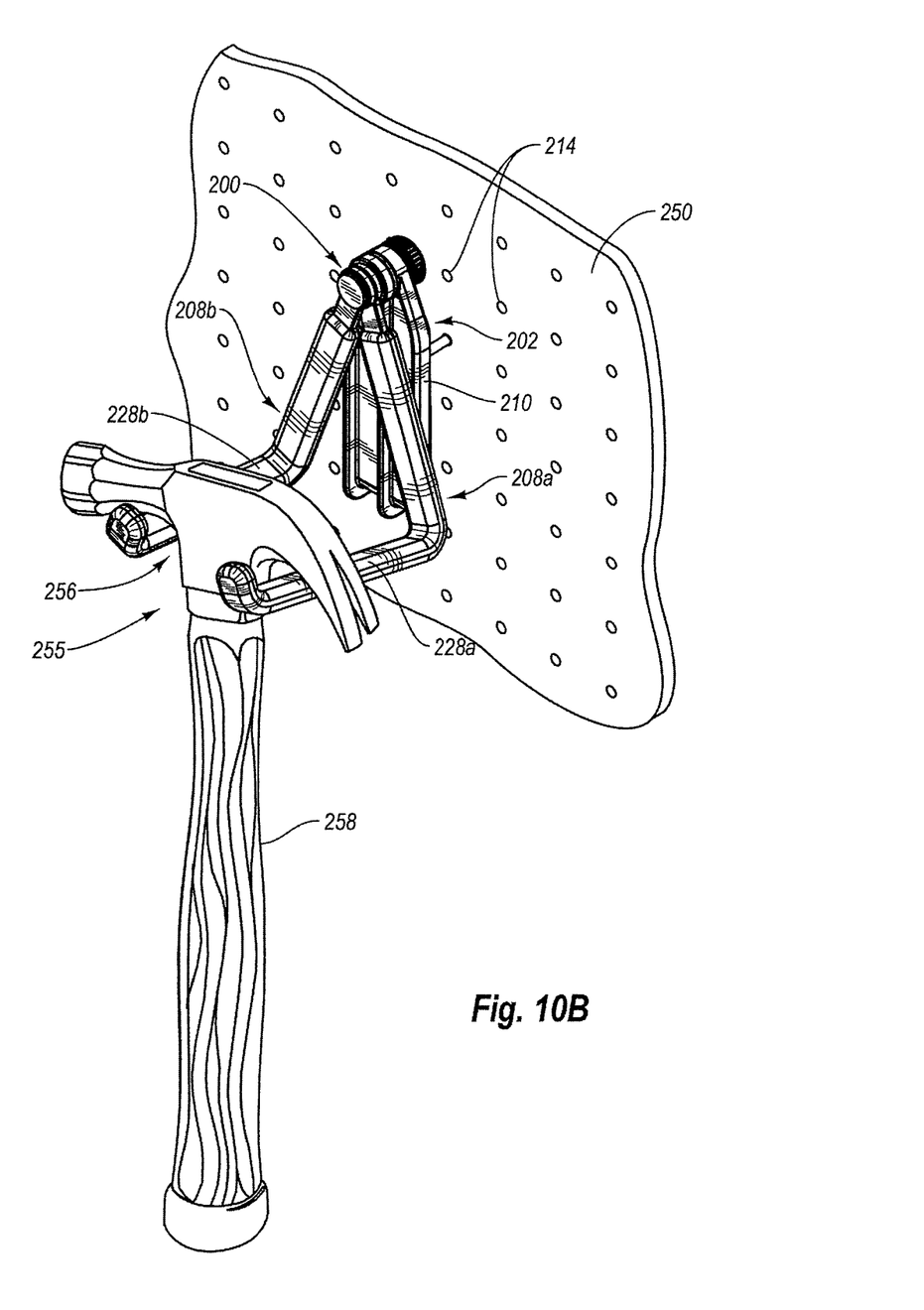
FIG. 10B is a perspective view of the hook of FIG. 10A mounted to a peg board with a hammer resting within the saddle of the hook.

FIGS. 10A-10B illustrate an alternative application and embodiment 200 which is similar to hook 100, but in which the frame 202 and means for attaching the frame to a support surface 250 have been modified. Frame 202 includes a vertical leg 210, with one or more angled pegs 212 extending outwardly from frame 202, opposite the arms 208a and 208b. As seen in FIG. 10B, pegs 212 can be inserted within complementary holes 214 of a pegboard 250. Hook 200 is illustrated supporting a hammer 255, in which the head 256 is supported by platform portions 228a, 228b, and handle 258 extends downward between platform portions 228a, 228b. In an embodiment where platform portions 228a, 228b include a magnetic material, steel hammer head 256 will be more securely held in place, preventing accidental dislodgement.

Figure 11A:
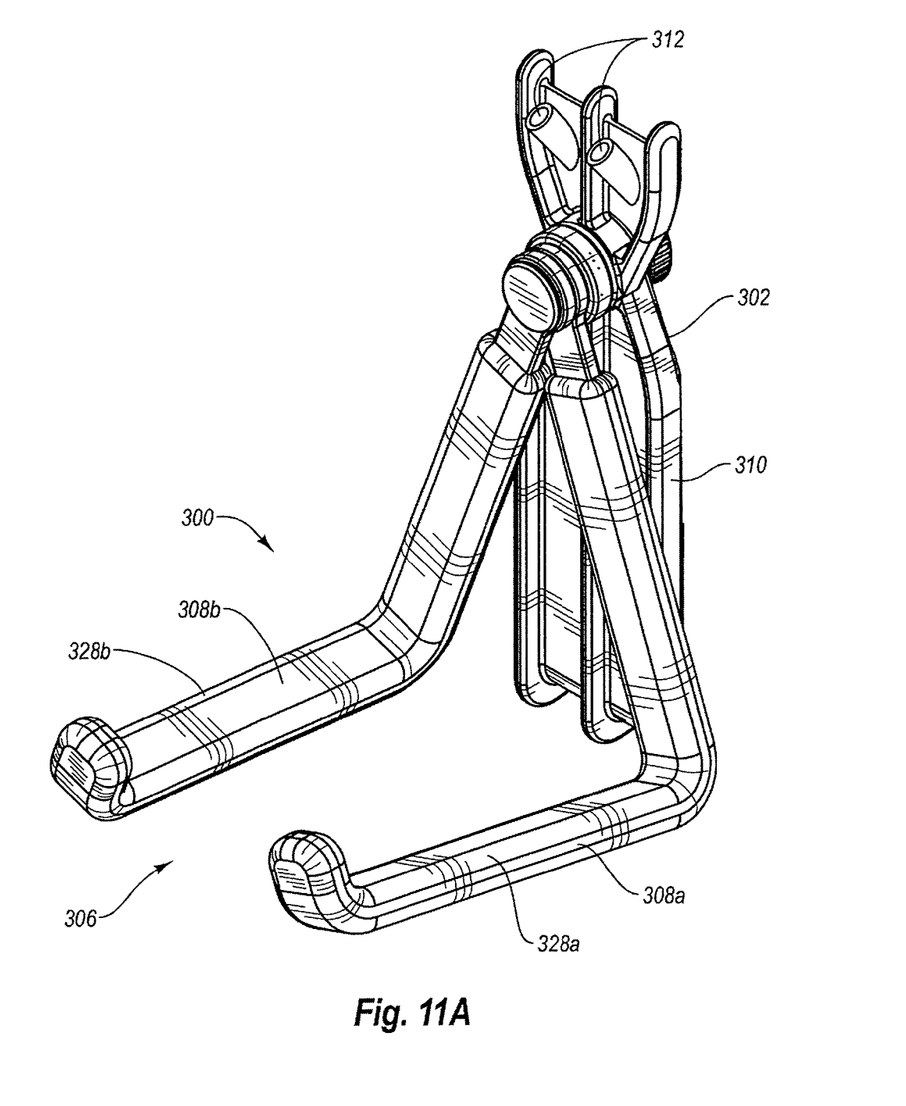
FIG. 11A is a perspective view of another alternative hook configured for mounting to a wall for use as a picture hook.
Figure 11B:
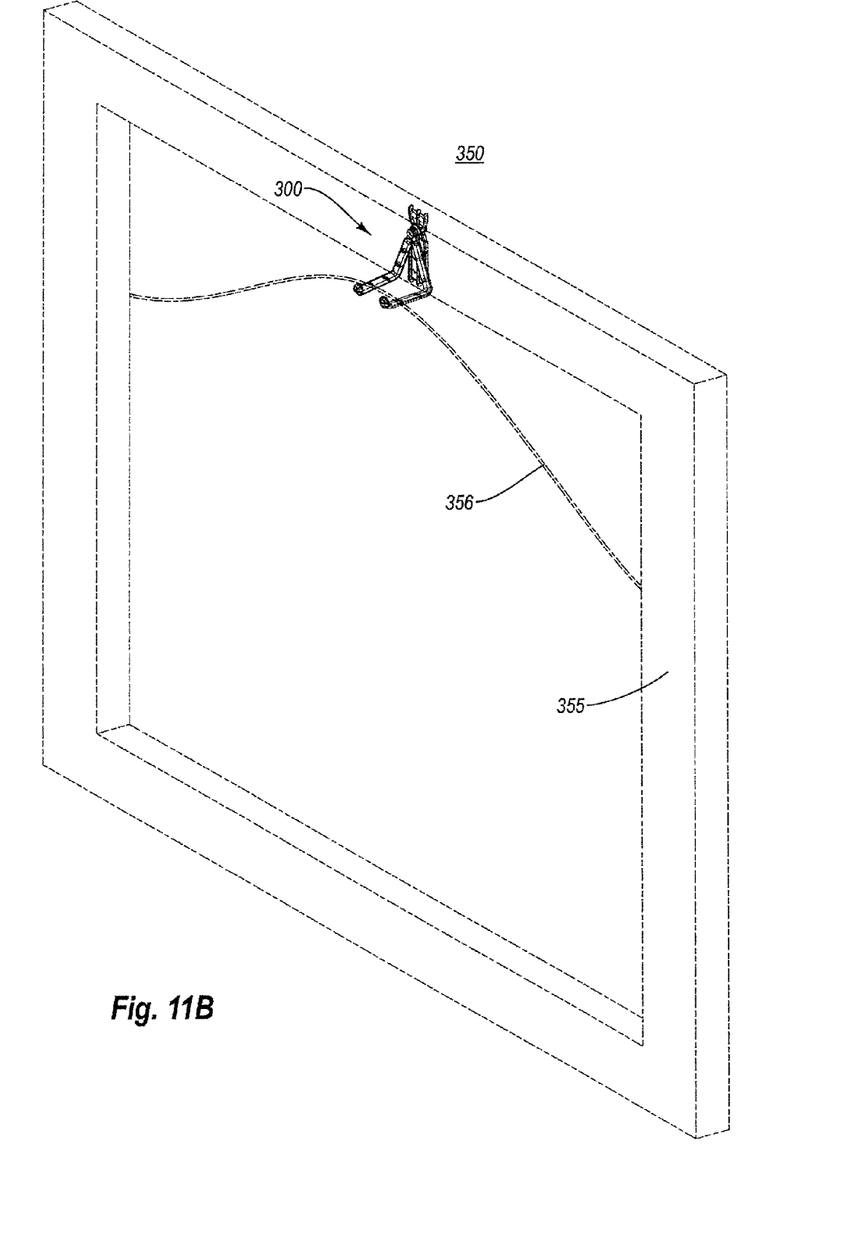
FIG. 11B is a perspective view of the hook of FIG. 11A mounted to a wall with a picture hanging from the saddle of the hook.

FIGS. 11A-11B illustrate an alternative application and embodiment 300 which is similar to hook 100, but in which the frame 302 and means for attaching the frame to a support surface 350 have been modified. Frame 302 includes a vertical leg 310, while also including one or more nail mounting holes 312 through which nails may be driven into adjacent wall 350 (FIG. 11B), so as to support hook 300 on wall 350. Hook 300 is illustrated supporting a picture 355, in which the picture hanging wire 356 is supported by platform arms 328a, 328b. Because saddle 306 is self-leveling, there is no need to ensure that hook 300 is mounted level on wall 350, as is typically required with existing picture hanging devices. Under its own weight and that of picture 355, saddle 306 will automatically level itself under influence of gravity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A self-leveling platform hook comprising:
    a C-shaped frame including a generally vertical leg, a foot member extending generally perpendicularly from a first end of the leg, and a bracket extending generally perpendicularly from an opposite end of the leg, spaced apart from the foot member so that the foot member and the bracket extend from the leg substantially parallel to one another, at least one of the bracket or the foot member including a hole formed therethrough for receiving at least a portion of means for attaching the C-shaped frame to a support surface;
    means coupled to the frame for attaching the frame to a support surface on which the self-leveling platform hook may be mounted; and
    a saddle comprising a pair of spaced apart generally L-shaped support arms, each generally L-shaped support arm including an upper arm portion and a lower platform arm portion extending substantially perpendicular to the corresponding upper arm portion, the arms being directly coupled to the generally vertical leg of the frame at an upper portion of each upper arm portion so that each L-shaped support arm is independently and selectively rotatable relative to the C-shaped frame and to one another so as to be self-leveling under influence of gravity, such that:
        the upper arm portions remain coplanar and transverse relative to one another as an angle between the upper arm portions is adjusted, the angle simultaneously adjusting a distance between the lower platform arm portions; and
        the lower platform arm portions remain substantially parallel to one another regardless of the angle selected between the upper arm portions, so that the lower platform arm portions can cradle and support an object of a desired width across the lower platform portions as an angle between the upper arm portions and a corresponding distance between the lower platform portions is selected.

2. A hook as recited in claim 1, wherein the means for attaching the frame to a support surface comprises a compression knob assembly including a threaded stem with a compression knob at a first end of the threaded stem and a compression disc at a second end of the threaded stem, the threaded stem being received through the hole formed within the bracket of the C-shaped frame.

3. A hook as recited in claim 1, wherein each support arm comprises a piece of metal bent to an L-shape with an elastomeric cover disposed over at least a portion of the metal.

4. A hook as recited in claim 3, wherein each support arm comprises a magnetic material so as to be magnetically attracted to a magnetically attractable material cradled within the saddle between the arms.

5. A hook as recited in claim 1, wherein each support arm includes a hole at an upper end thereof, the upper end of one arm being located over the upper end of the other support arm such that the holes of the support arms are aligned to receive a fastener coupling the arms to the generally vertical leg of the frame.

6. A hook as recited in claim 5, wherein the fastener comprises a threaded stem with a knob at one end and a nut that couples to an end of the threaded stem opposite the knob.

7. A table mountable self-leveling hook, comprising:
    a C-shaped frame including a leg, a substantially perpendicular foot member at a first end of the leg, and a bracket disposed perpendicular to the leg at an opposite end of the leg and spaced apart from the foot member such that the foot member and bracket extend substantially parallel to one another, at least one of the bracket or foot member including a threaded hole for receiving a portion of a compression knob assembly;
    a compression knob assembly including a threaded stem with a compression knob at a first end of the stem and a compression disc at a second end of the stem, the threaded stem of the compression knob assembly being threadably received within the threaded hole of the frame bracket or foot member; and
    a saddle comprising first and second L-shaped support arms, each L-shaped support arm including an upper arm portion and a lower platform arm portion extending substantially perpendicular to the corresponding upper arm portion, each upper arm portion being directly coupled at an upper end thereof to a front surface of the leg of the frame opposite from a back surface of the leg from which the foot and bracket members extend, so that each L-shaped support arm is independently and selectively rotatable relative to the frame and one another so as to allow adjustment of a distance between the lower platform arm portions and an angle between the upper arm portions of the support arms
    wherein the upper arm portions remain coplanar and transverse relative to one another as an angle between the upper arm portions is adjusted; and
    wherein the lower platform arm portions remain substantially parallel to one another regardless of the angle selected between the upper arm portions so that the lower platform arm portions can cradle and support an object of a desired with across the lower platform portions as an angle between the upper arm portions and a corresponding distance between the lower platform portions is selected.

8. A hook as recited in claim 7, wherein each support arm comprises a piece of metal bent to an L-shape with an elastomeric cover disposed over at least a portion of the metal.

9. A hook as recited in claim 8, wherein each support arm comprises a magnetic material so as to be magnetically attracted to a magnetically attractable material cradled within the saddle between the arms.

10. A hook as recited in claim 7, wherein each support arm includes a hole at an upper end thereof, the upper end of one arm being located over the upper end of the other support arm such that the holes of the support arms are aligned to receive a fastener coupling the arms to the frame.

11. A hook as recited in claim 10, wherein the fastener comprises a threaded stem with a knob at one end and a nut that couples to an end of the threaded stem opposite the knob.

12. A hook as recited in claim 11, wherein the fastener coupling the arms to the generally vertical leg of the frame is disposed above the bracket extending substantially perpendicularly away from the generally vertical leg of the frame.

13. A kit for table-side mounting of a generally gun shaped tape dispenser, comprising:
  a generally gun-shaped tape dispenser comprising:
    an upper dispensing portion disposed at an upper end thereof, and an elongate handle connected to the dispensing portion near the center of the dispensing portion such that the handle extends downwardly away from the dispensing portion so as to define a gripping end of the gun-shaped tape dispenser; and
  a table mountable hook for supporting the tape dispenser comprising:
    a C-shaped frame including a vertical leg, a foot member extending perpendicularly from a first end of the leg, and a bracket extending from the leg parallel to and spaced apart from the foot member, at least one of the bracket or foot member including a threaded hole for receiving a portion of a compression knob assembly;
    a compression knob assembly including a threaded stem with a knob at a first end thereof and a compression disc at a second end thereof, the stem being threadably engaged within the threaded hole of the bracket or foot member; and
    a saddle comprising a pair of L-shaped support arms, each arm including an upper arm portion and a lower platform arm portion extending substantially perpendicular to the corresponding upper arm portion, the upper arm portions each being directly coupled at an end opposite where the corresponding lower platform arm portion extends from each corresponding upper arm portion to a front side of the vertical leg of the frame opposite from a back side of the frame from which the foot member and bracket extend, the arms being independently and selectively rotatable relative to the frame and one another so as to allow adjustment of an angle between the upper arm portions and a distance between the lower platform arm portions of the arms so as to permit the elongate handle of the tape dispenser to extend through the space between the lower platform arm portions such that the upper dispensing portion of the tape dispenser rests on the lower platform arm portions of the L-shaped support arms when the hook is used:
    wherein the upper arm portions remain coplanar and transverse relative to one another as an angle between the upper arm portions is adjusted; and
    wherein the lower platform arm portions remain substantially parallel to one another regardless of the angle selected between the upper arm portions.

14. A hook as recited in claim 13, further comprising a magnetic material disposed on or within each lower platform arm portion and an associated magnetically attractable material disposed on or within that portion of the upper dispensing portion of the tape dispenser that rests on the lower platform arm portions when the tape dispenser is received between the support arms of the hook, such that the magnetic material of the lower platform arm portion is attracted to the magnetically attractable material disposed on or within the upper dispensing portion of the tape dispenser, stabilizing the tape dispenser within the hook.

15. A hook as recited in claim 13, wherein the lower platform arm portion is formed of a magnetically attractable material and a magnetic material is disposed on or within that portion of the upper dispensing portion of the tape dispenser that rests on the lower platform arm portions when the tape dispenser is received between the support arms of the hook, such that the magnetically attractable material of the lower platform arm portion is attracted to the magnetic material disposed on or within the upper dispensing portion of the tape dispenser, stabilizing the tape dispenser within the hook.

16. A self-leveling platform hook comprising:
  a C-shaped frame consisting of a leg, a foot member extending generally perpendicularly from a first end of the leg, and a bracket extending generally perpendicularly from an opposite end of the leg, spaced apart from the foot member so that the foot member and the bracket extend from the leg substantially parallel to one another;
  means coupled to the frame for attaching the frame to a support surface on which the self-leveling platform hook may be mounted; and
  a saddle comprising a pair of spaced apart generally L-shaped support arms, each generally L-shaped support arm including an upper arm portion and a lower platform arm portion extending substantially perpendicular to the corresponding upper arm portion, the arms being directly coupled to the leg of the frame at an upper portion of each upper arm portion so that each L-shaped support arm is independently selectively rotatable relative to the C-shaped frame and each other so as to be self-leveling under influence of gravity, such that:
    the upper arm portions remain coplanar and transverse relative to one another as an angle between the upper arm portions is adjusted, the angle simultaneously adjusting a distance between the lower platform arm portions; and
    the lower platform arm portions remain substantially parallel to one another regardless of the angle selected between the upper arm portions so that the lower platform arm portions can cradle and support an object of a desired width across the lower platform portions as an angle between the upper arm portions and a corresponding distance between the lower platform portions is selected.

* * * * *